(12) United States Patent
Tomizawa

(10) Patent No.: US 12,032,262 B2
(45) Date of Patent: Jul. 9, 2024

(54) DISPLAY DEVICE

(71) Applicant: Japan Display Inc., Tokyo (JP)

(72) Inventor: Kazunari Tomizawa, Tokyo (JP)

(73) Assignee: Japan Display Inc., Tokyo (JP)

(*) Notice: Subject to any disclaimer, the term of this patent is extended or adjusted under 35 U.S.C. 154(b) by 591 days.

(21) Appl. No.: 17/313,164

(22) Filed: May 6, 2021

(65) Prior Publication Data

US 2021/0255520 A1 Aug. 19, 2021

Related U.S. Application Data

(63) Continuation of application No. PCT/JP2019/031532, filed on Aug. 8, 2019.

(30) Foreign Application Priority Data

Nov. 9, 2018 (JP) ................. 2018-211452

(51) Int. Cl.
*G02F 1/1685* (2019.01)
*G02F 1/1335* (2006.01)
(Continued)

(52) U.S. Cl.
CPC ...... *G02F 1/1685* (2019.01); *G02F 1/133514* (2013.01); *G02F 1/167* (2013.01); *G02F 1/1676* (2019.01); *G02F 1/1677* (2019.01)

(58) Field of Classification Search
CPC .... G02F 1/1685; G02F 1/1676; G02F 1/1677; G02F 1/133514; G02F 1/167
(Continued)

(56) References Cited

U.S. PATENT DOCUMENTS

2002/0180688 A1 12/2002 Drzaic et al.
2014/0240816 A1 8/2014 Kinoshita et al.
(Continued)

FOREIGN PATENT DOCUMENTS

JP 2002511607 A 4/2002
JP 2013076843 A 4/2013
(Continued)

OTHER PUBLICATIONS

Japanese Office Action issued Jun. 28, 2022 in corresponding Japanese Application No. 201-211452.
(Continued)

*Primary Examiner* — William Choi
(74) *Attorney, Agent, or Firm* — K&L Gates LLP

(57) ABSTRACT

According to an aspect, a display device includes: a display substrate; and a filter provided on a display surface side of the display substrate. The filter includes a first sub-pixel area provided with a first color filter, a second sub-pixel area provided with a second color filter, a third sub-pixel area provided with a third color filter, and a colorless fourth sub-pixel area. The display substrate includes a plurality of pixels provided so as to be capable of individually switching each sub-pixel between white, black, and red, and each of the pixels includes a first sub-pixel overlapping the first sub-pixel area, a second sub-pixel overlapping the second sub-pixel area, a third sub-pixel overlapping the third sub-pixel area, and a fourth sub-pixel overlapping the fourth sub-pixel area.

16 Claims, 7 Drawing Sheets

(51) Int. Cl.
  *G02F 1/167*   (2019.01)
  *G02F 1/1676*  (2019.01)
  *G02F 1/1677*  (2019.01)

(58) Field of Classification Search
  USPC .......................................................... 359/296
  See application file for complete search history.

(56) References Cited

U.S. PATENT DOCUMENTS

| | | |
|---|---|---|
| 2014/0340736 A1 | 11/2014 | Lin |
| 2015/0301424 A1 | 10/2015 | Lo et al. |
| 2016/0293111 A1 | 10/2016 | Lin et al. |
| 2017/0263176 A1* | 9/2017 | Lin ..................... G09G 3/2003 |
| 2017/0285435 A1 | 10/2017 | Kasegawa |
| 2018/0315377 A1 | 11/2018 | Lin et al. |
| 2019/0271878 A1 | 9/2019 | Tsuruda et al. |
| 2021/0005148 A1 | 1/2021 | Lin et al. |

FOREIGN PATENT DOCUMENTS

| | | | |
|---|---|---|---|
| JP | 2013250325 A | | 12/2013 |
| JP | 2016520214 A | | 7/2016 |
| JP | 2018-013718 | | 1/2018 |
| JP | 2018511833 A | | 4/2018 |
| WO | 2016043057 A1 | | 3/2016 |
| WO | 2018092877 A1 | | 5/2018 |

OTHER PUBLICATIONS

International Search Report mailed Nov. 5, 2019 in connection with PCT/JP2019/031532.

\* cited by examiner

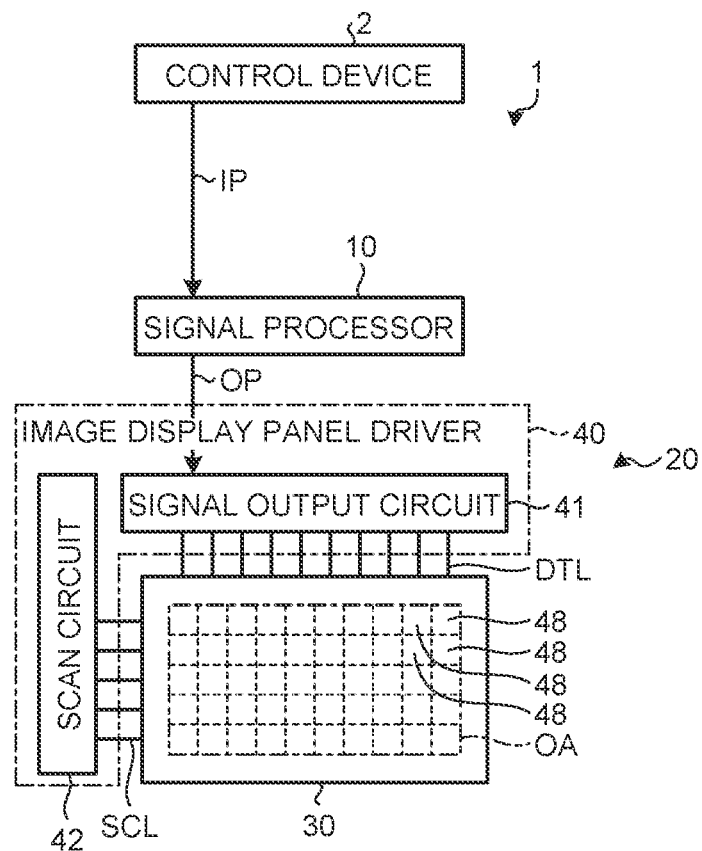
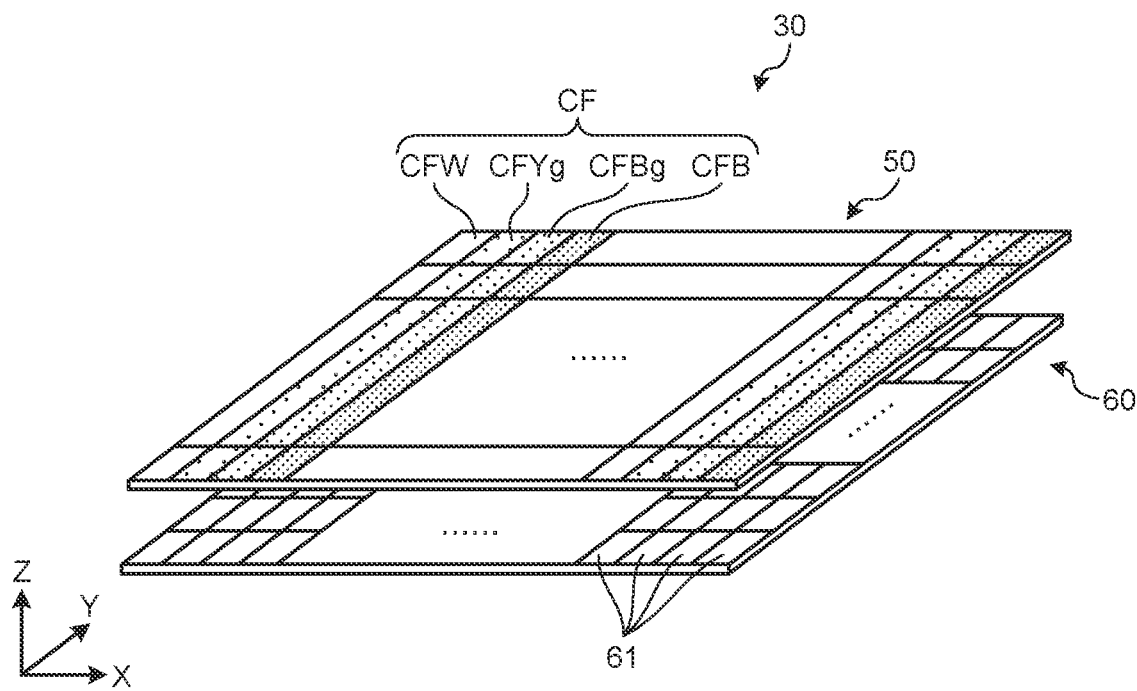

| CF COLOR<br>DISPLAY COLOR | W | Yg | Bg | B |
|---|---|---|---|---|
| RED | Red | Red | Black | Black |
| YELLOW | Red | White | White | Black |
| GREEN | Black | White | White | Black |
| CYAN | Black | White | White | White |
| BLUE | Black | Black | Black | White |
| PURPLE | Red | Black | Black | White |
| WHITE | White | White | White | White |

FIG.10

| CF COLOR / DISPLAY COLOR | W | Yg | Bg | B |
|---|---|---|---|---|
| RED | Red | Red | Black | Red |
| YELLOW | Red | White | White | Red |
| GREEN | Black | White | White | Black |
| CYAN | Black | White | White | White |
| BLUE | Black | Black | Black | White |
| PURPLE | Red | Black | Black | White |
| WHITE | White | Red | White | White |

DISPLAY DEVICE

CROSS-REFERENCE TO RELATED APPLICATION

This application claims the benefit of priority from Japanese Patent Application No. 2018-211452 filed on Nov. 9, 2018 and International Patent Application No. PCT/JP2019/031532 filed on Aug. 8, 2019, the entire contents of which are incorporated herein by reference.

BACKGROUND

1. Technical Field

What is disclosed herein relates to a display device.

2. Description of the Related Art

Electronic paper using an electrophoretic fluid containing a plurality of pigment particles is known as one form of a display device (refer, for example, to Japanese Translation of PCT Application Publication No. 2018-511833 (JP-T-2018-511833)).

In the technology described in JP-T-2018-511833, reproducible colors are limited to colors of the pigment particles, and a wider variety of display colors than those of the pigment particles are difficult to be reproduced.

For the foregoing reasons, there is a need for a display device capable of reproducing a wider variety of display colors.

SUMMARY

According to an aspect, a display device includes: a display substrate; and a filter provided on a display surface side of the display substrate. The filter includes a first sub-pixel area provided with a first color filter, a second sub-pixel area provided with a second color filter, a third sub-pixel area provided with a third color filter, and a colorless fourth sub-pixel area. The display substrate includes a plurality of pixels provided so as to be capable of individually switching each sub-pixel between white, black, and red, and each of the pixels includes a first sub-pixel overlapping the first sub-pixel area, a second sub-pixel overlapping the second sub-pixel area, a third sub-pixel overlapping the third sub-pixel area, and a fourth sub-pixel overlapping the fourth sub-pixel area.

BRIEF DESCRIPTION OF THE DRAWINGS

FIG. 1 is a diagram illustrating a main configuration example of a display device according to an embodiment;

FIG. 2 is a schematic diagram illustrating a main configuration of an image display panel;

FIG. 10 is a tabular diagram illustrating a modification of the relation of the display colors reproduced by the pixel with the combinations of colors of the color filters included in the sub-pixels and the state of the sub-pixels.

DETAILED DESCRIPTION

Figure 3:
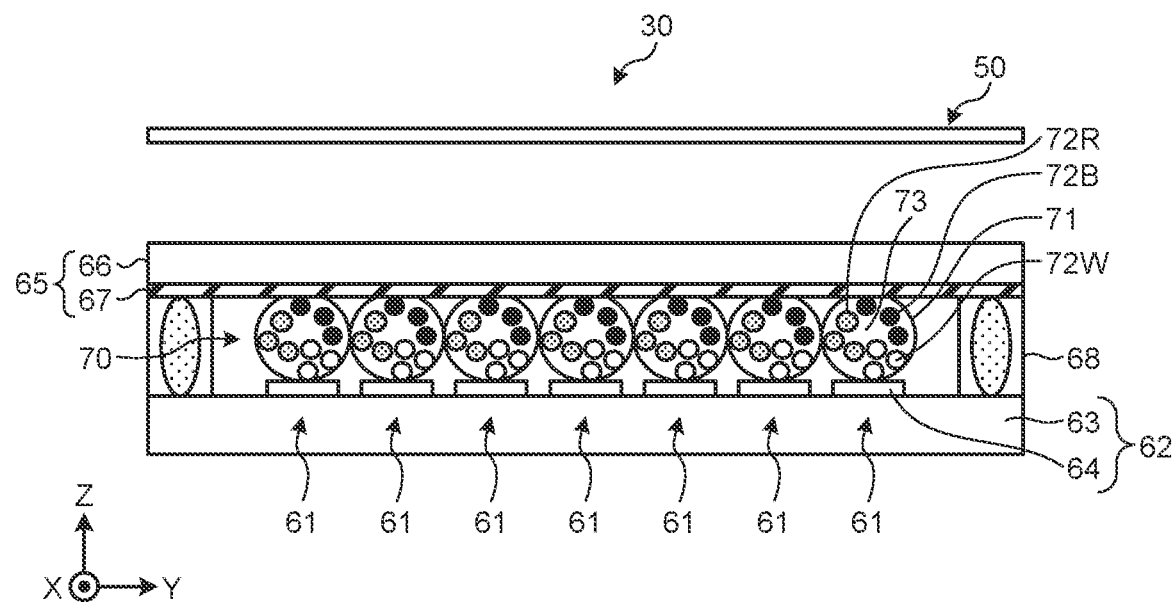
FIG. 3 is a schematic sectional diagram illustrating the main configuration of the image display panel.

The following describes an embodiment of the present disclosure with reference to the drawings. The disclosure is merely an example, and the present disclosure naturally encompasses appropriate modifications easily conceivable by those skilled in the art while maintaining the gist of the disclosure. To further clarify the description, the drawings schematically illustrate widths, thicknesses, shapes, and other properties of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

FIG. 1 is a diagram illustrating a main configuration example of a display device 1 according to the embodiment. As illustrated in FIG. 1, the display device 1 of the embodiment includes a signal processor 10 and a display unit 20. The signal processor 10 performs various output operations based on an input signal IP received from an external control device 2. The input signal IP is a signal that serves as data for outputting an image displayed on the display device 1, and is, for example, a red-green-blue (RGB) image signal. The signal processor 10 outputs an output image signal OP generated based on the input signal IP to the display unit 20.

The display unit 20 includes an image display panel 30 and an image display panel driver 40. The image display panel 30 is a panel including a plurality of pixels 48, and, more specifically, includes a display area OA provided with the pixels 48. The pixels 48 are, for example, arranged in a matrix having a row-column configuration. The image display panel driver 40 includes a signal output circuit 41 and a scan circuit 42. The signal output circuit 41 drives the pixels 48 depending on the output image signal OP. The scan circuit 42 outputs a drive signal that scans the pixels 48 arranged in the matrix having a row-column configuration, in units of predetermined rows (such as row by row). Each of the pixels 48 is driven so as to output a gradation value corresponding to the output image signal OP at a timing when the drive signal is output.

FIG. 2 is a schematic diagram illustrating a main configuration of the image display panel 30. The image display panel 30 includes a filter 50 and a display substrate 60. The display substrate 60 includes a plurality of sub-pixels 61. The sub-pixels 61 are arranged in a matrix having a row-column configuration. Hereinafter, an XY-plane denotes a plane in which the sub-pixels 61 are arranged; an X-direction denotes one of the directions of arrangement of the sub-pixels 61; a Y-direction denotes the other of the directions of arrangement of the sub-pixels 61; and a Z-direction denotes a direction orthogonal to the XY-plane.

FIG. 3 is a schematic sectional diagram illustrating the main configuration of the image display panel 30. As illustrated in FIG. 3, the display substrate 60 includes a pixel substrate 62, a counter substrate 65 disposed so as to face the pixel substrate 62, an electrophoretic layer 70 disposed between the pixel substrate 62 and the counter substrate 65, and a seal 68.

The pixel substrate 62 includes a base material 63 and pixel electrodes 64. The counter substrate 65 includes a base material 66 and a counter electrode 67. The base material 63 and the base material 66 are each a light-transmitting glass substrate, a light-transmitting resin substrate, or a light-transmitting resin film. The pixel electrodes 64 are provided on a side of the base material 63 facing the counter substrate 65. The pixel electrodes 64 are individually provided for each of the sub-pixels 61. In FIG. 3, the pixel electrodes 64 are provided one for each of the sub-pixels 61. However, the pixel electrodes 64 may be provided more than one for each of the sub-pixels 61. The counter electrode 67 is provided on a side of the base material 66 facing the pixel substrate 62. The counter electrode 67 is formed of an indium tin oxide (ITO) serving as a light-transmitting conductive film. The counter electrode 67 is shared among the sub-pixels 61. The counter electrode 67 faces the pixel electrodes 64 with the electrophoretic layer 70 interposed therebetween. The counter electrode 67 is supplied with a common potential VCOM.

The seal 68 is provided between the pixel substrate 62 and the counter substrate 65. The electrophoretic layer 70 is sealed in an internal space surrounded by the pixel substrate 62, the counter substrate 65, and the seal 68.

The electrophoretic layer 70 includes, for example, a plurality of microcapsules 71. Each of the microcapsules 71 encapsulates a plurality of white particles 72W, a plurality of black particles 72B, a plurality of red particles 72R, and a dispersion liquid 73. The electrophoretic layer 70 including these materials serves as an electrophoretic fluid. The white particles 72W, the black particles 72B, and the red particles 72R are dispersed in the dispersion liquid 73. The dispersion liquid 73 is a light-transmitting liquid, such as silicone oil. The white particles 72W, the black particles 72B, and the red particles 72R are electrophoretic particles. The white particles 72W, the black particles 72B, and the red particles 72R have optical characteristics different from one another. The white particles 72W look white. The black particles 72B look black. The red particles 72R look red. Each type of particles among the white particles 72W, the black particles 72B, and the red particles 72R reflects light corresponding to a color viewed by a viewer. In other words, a spectrum of the light reflected by each type of particles among the white particles 72W, the black particles 72B, and the red particles 72R corresponds to the color viewed by the viewer.

The white particles 72W, the black particles 72B, and the red particles 72R have electrical characteristics different from one another. For example, the white particles 72W have a charge polarity different from that of the black particles 72B. In the embodiment, the white particles 72W are charged positive, and the black particles 72B are charged negative. The red particles 72R are charged negative, but the intensity of the charge is lower than that of the black particles 72B.

Figure 4:
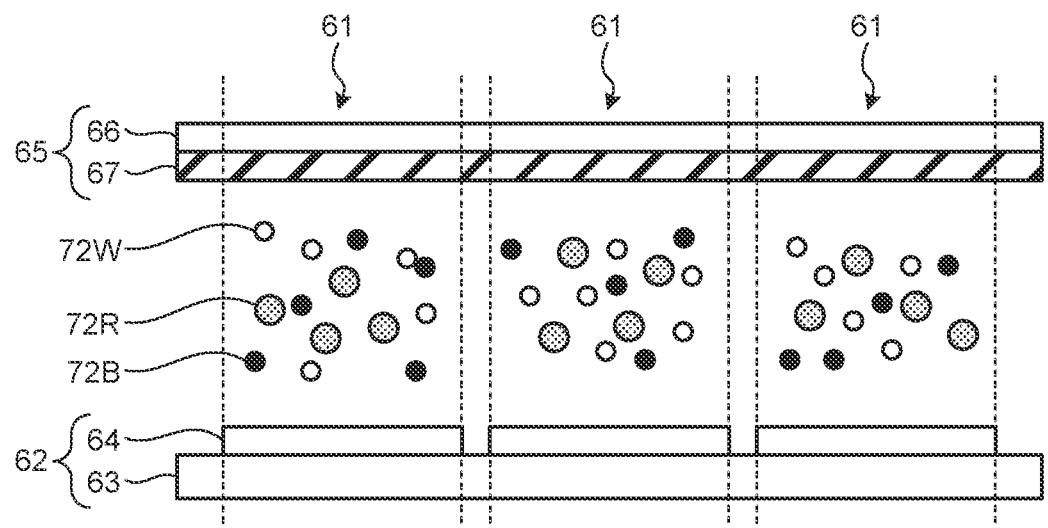
FIG. 4 is a schematic diagram illustrating sub-pixels in a non-operating state.
Figure 5:
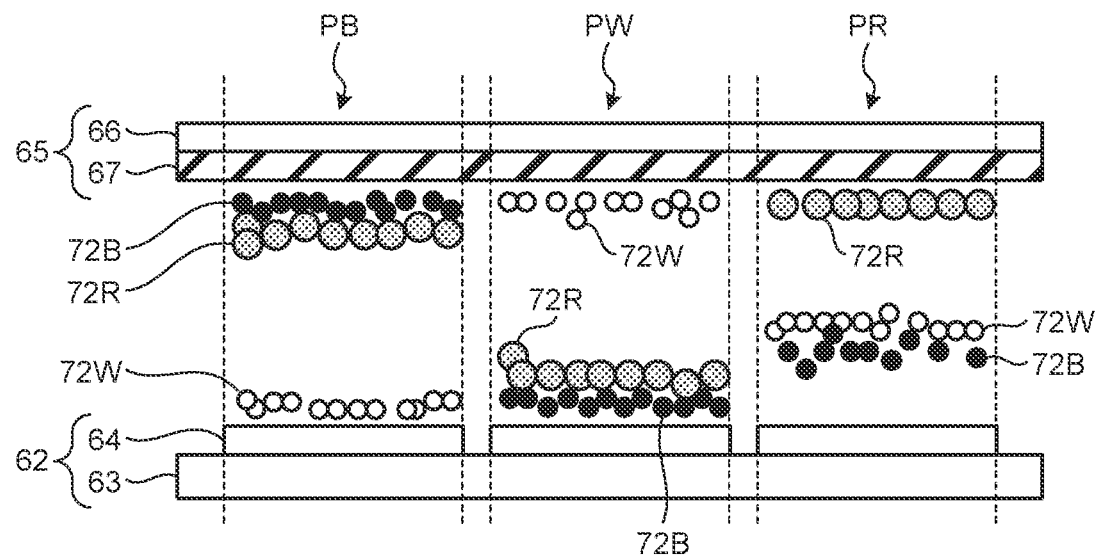
FIG. 5 is a schematic diagram illustrating the sub-pixels in an operating state.

FIG. 4 is a schematic diagram illustrating the sub-pixels 61 in a non-operating state. FIG. 5 is a schematic diagram illustrating the sub-pixels 61 in an operating state. In the non-operating state of the image display panel 30, that is, in a state where no potential difference is present between the pixel electrodes 64 and the counter electrode 67, the white particles 72W, the black particles 72B, and the red particles 72R are dispersed without being unevenly distributed closer to neither the pixel substrate 62 nor the counter substrate 65, as illustrated in FIG. 4. In contrast, in the operating state of the image display panel 30, that is, in a state where a potential difference is present between the pixel electrodes 64 and the counter electrode 67, any one type of particles among the white particles 72W, the black particles 72B, and the red particles 72R move so as to be unevenly distributed closer to the counter substrate 65, as illustrated in FIG. 5. In this way, the dispersion state of the white particles 72W, the black particles 72B, and the red particles 72R is changed by an electric field formed between the pixel electrodes 64 and the counter electrode 67. The spectrum of the light reflected by the electrophoretic layer 70 changes with the dispersion state of the white particles 72W, the black particles 72B, and the red particles 72R.

In the embodiment, the common potential VCOM (of 0 V, for example) is supplied to the counter electrode 67. In this state, when a first potential is supplied to the pixel electrodes 64, the black particles 72B move closest to the counter substrate 65 as illustrated as a black reflection state PB in FIG. 5; when a second potential is supplied to the pixel electrodes 64, the white particles 72W move closest to the counter substrate 65 as illustrated as a white reflection state PW in FIG. 5; and when a third potential is supplied to the pixel electrodes 64, the red particles 72R move closest to the counter substrate 65 as illustrated as a red reflection state PR in FIG. 5. Denoting $\alpha$ as the first potential, $\beta$ as the second potential, and $\gamma$ as the third potential, a relation $\beta<0<\gamma<\alpha$ is satisfied in the embodiment. $\alpha$ is, for example, 15 [V]. $\beta$ is, for example, −15 [V]. $\gamma$ is, for example, 5 [V]. This relation merely illustrates a relative relation between the potentials on an assumption of charge states of the white particles 72W, the black particles 72B, and the red particles 72R exemplified in the embodiment. The charge states of the white particles 72W, the black particles 72B, and the red particles 72R and the first, the second, and the third potentials can be changed as appropriate.

The filter 50 is provided on the counter substrate 65 side of the display substrate 60, that is, on a display surface side of the image display panel 30. The filter 50 is provided with color filters CF. The color filters CF include a first color filter CFYg, a second color filter CFBg, a third color filter CFB, and a fourth filter CFW. The color filters CF are light-transmitting members. The color filters CF of the embodiment are, for example, light-transmitting plates or light-transmitting films of a resin, but are not limited thereto, and may have another configuration such as of glass plates that provide the same function.

The first color filter CFYg, the second color filter CFBg, the third color filter CFB, and the fourth filter CFW transmit light having different spectral peaks. The light transmitted by the first color filter CFYg has a spectrum with a peak in green closer to red. The light transmitted by the second color filter CFBg has a spectrum with a peak in green closer to blue. The light transmitted by the third color filter CFB has a spectrum with a peak in blue. The light transmitted by the fourth filter CFW has a spectrum with a peak that does not have any characteristic bias. The fourth filter CFW evenly transmits visible light. The area of the fourth filter CFW serves as what is called a colorless transmitted light area. In the embodiment, a colorless light-transmitting member (light-transmitting plate or light-transmitting film) is provided as the fourth filter CFW. However, the area of the fourth filter CFW may be a cavity or a gap without being provided with any light-transmitting member.

In the filter 50 of the embodiment, the fourth filter CFW, the first color filter CFYg, the second color filter CFBg, and the third color filter CFB are arranged in the order as listed, from one end side toward the other end side in the X-direction. Hereinafter, the color filters CF including one fourth filters CFW, one first color filters CFYg, one second color filters CFBg, and one third color filters CFB arranged in the above-listed order are referred to as a set of the color filters CF. A plurality of the sets of the color filters CF are arranged in the X-direction in the filter 50 of the embodiment. As illustrated in FIG. 2, a width in the X-direction of each of the fourth filter CFW, the first color filter CFYg, the second color filter CFBg, and the third color filter CFB corresponds to a width in the X-direction of each of the sub-pixels 61. A longitudinal direction of the color filters CF of the embodiment extends along the Y-direction. As illustrated in FIG. 2, in the color filters CF of the embodiment, each section having a width corresponding to a width in the Y-direction of the sub-pixel 61 is demarcated by a black matrix. The filter 50 of the embodiment is a plate-like or film-like member provided in a grid form so as to form the black matrix, and has the color filters CF mounted thereon.

Figure 6:
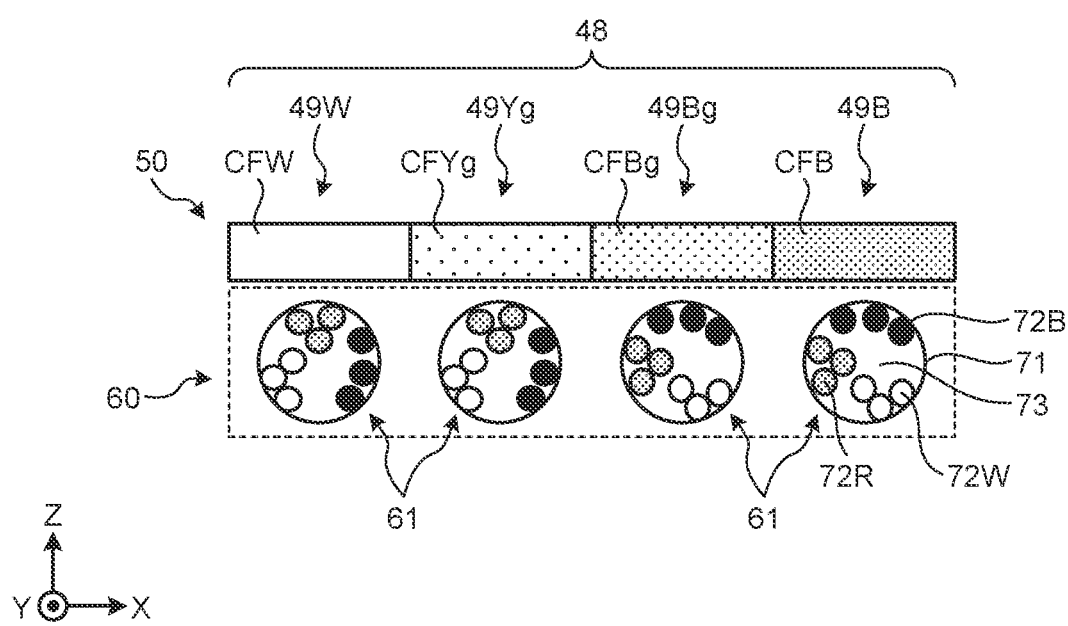
FIG. 6 is a schematic diagram illustrating a configuration example of a pixel.

FIG. 6 is a schematic diagram illustrating a configuration example of each of the pixels 48. Each of the pixels 48 includes one white sub-pixel 49W, one yellow-green sub-pixel 49Yg, one blue-green sub-pixel 49Bg, and one blue sub-pixel 49B.

The white sub-pixel 49W is a sub-pixel provided with the fourth filter CFW on a display surface side of the sub-pixel 61. An area provided with the fourth filter CFW serves as a fourth sub-pixel area. The yellow-green sub-pixel 49Yg is a sub-pixel provided with the first color filter CFYg on the display surface side of the sub-pixel 61. An area provided with the first color filter CFYg serves as a first sub-pixel area. The blue-green sub-pixel 49Bg is a sub-pixel provided with the second color filter CFBg on the display surface side of the sub-pixel 61. An area provided with the second color filter CFBg serves as a second sub-pixel area. The blue sub-pixel 49B is a sub-pixel provided with the third color filter CFB on the display surface side of the sub-pixel 61. An area provided with the third color filter CFB serves as a third sub-pixel area.

Figures 7, 8:
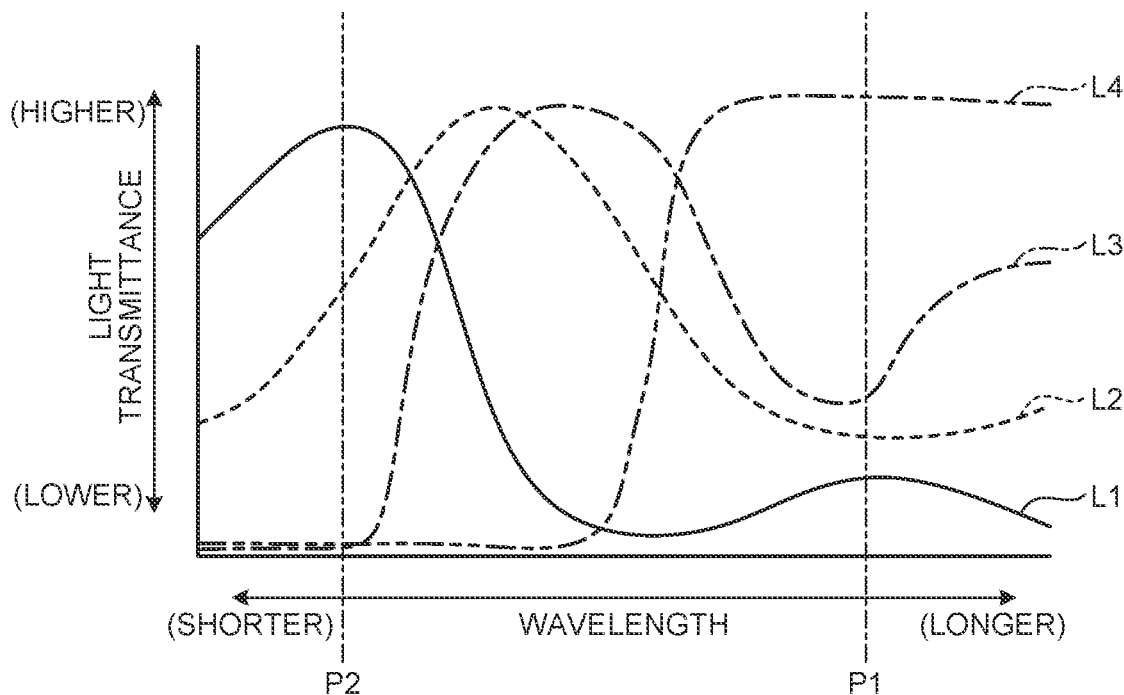
FIG. 7 is a schematic graph illustrating a relation between a wavelength and light transmittance of light transmitted by each of a first color filter, a second color filter, and a third color filter, and a wavelength of light reflected by red particles.
FIG. 8 is a tabular diagram illustrating an example of a relation of display colors reproduced by the pixel with combinations of colors of the color filters included in the sub-pixels and a state of the sub-pixels.

FIG. 7 is a schematic graph illustrating a relation between a wavelength and light transmittance of the light transmitted by each of the first color filter CFYg, the second color filter CFBg, and the third color filter CFB, and a wavelength of the light reflected by the red particles 72R. A line L1 represents the relation between the wavelength and the light transmittance of the light transmitted by the third color filter CFB. A dashed line L2 represents the relation between the wavelength and the light transmittance of the light transmitted by the second color filter CFBg. A long dashed short dashed line L3 represents the relation between the wavelength and the light transmittance of the light transmitted by the first color filter CFYg. A long dashed double-short dashed line L4 represents the relation between the wave-length of the light reflected by the red particles 72R. The long dashed double-short dashed line L4 also represents the relation between the wavelength and the light transmittance of the light transmitted by the fourth filter CFW when the sub-pixel 61 is in the red reflection state PR.

A first wavelength P1 of the spectrum of the light illustrated in FIG. 7 is that of a spectrum of light recognized as red by a human viewer. A second wavelength P2 of the spectrum of the light illustrated in FIG. 7 is that of a spectrum of light recognized as blue by the human viewer. Light having a peak near an intermediate position between the first wavelength P1 and the second wavelength P2 is recognized as green by the human viewer. As illustrated by the relations represented by the dashed line L2 and the long dashed short dashed line L3, the peak of the spectrum of the light transmitted by the first color filter CFYg is located in the green color area closer to red than the color of the second color filter CFBg. In other words, the peak of the spectrum of the light transmitted by the second color filter CFBg is located in the green color area closer to blue than the color of the first color filter CFYg. As illustrated in FIG. 7, the peak of the spectrum of the light transmitted by the third color filter CFB is located in the blue color area.

When the sub-pixel 61 is in the white reflection state PW, the spectrum of the light that is incident from the display surface side of the image display panel 30, is reflected by the white particles 72W, and is transmitted by the third color filter CFB corresponds to the line L1. That is, when the sub-pixel 61 is in the white reflection state PW, the spectrum of the light emitted toward the display surface by the blue sub-pixel 49B corresponds to the line L1. In the same way, when the sub-pixel 61 is in the white reflection state PW, the spectrum of the light emitted toward the display surface by the blue-green sub-pixel 49Bg corresponds to the dashed line L2, and when the sub-pixel 61 is in the white reflection state PW, the spectrum of the light emitted toward the display surface by the yellow-green sub-pixel 49Yg corresponds to the long dashed short dashed line L3.

The fourth filter CFW transmits light that does not have any characteristic bias in its spectral peak, and evenly transmits the visible light. Thus, when the sub-pixel 61 included in the white sub-pixel 49W and having the fourth filter CFW on the display surface side thereof is in the red reflection state PR, the spectrum of the light passing through the fourth filter CFW corresponds to that of the light reflected by the red particles 72R, as represented by the long dashed double-short dashed line L4. When the sub-pixel 61 is in the red reflection state PR, the spectrums of the light emitted toward the display surface by the blue sub-pixel 49B, the blue-green sub-pixel 49Bg, and the yellow-green sub-pixel 49Yg correspond to those of the light obtained by transmitting light represented by the long dashed double-short dashed line L4 at the light transmittances represented by the line L1, the dashed line L2, and the long dashed short dashed line L3, respectively.

When the sub-pixel 61 is in the black reflection state PB, the color is viewed as a reproduced black color regardless of which of the first color filter CFYg, the second color filter CFBg, the third color filter CFB, and the fourth filter CFW is used as the color filter CF provided on the display surface side. That is, when the sub-pixel 61 is in the black reflection state PB, the white sub-pixel 49W, the yellow-green sub-pixel 49Yg, the blue-green sub-pixel 49Bg, and the blue sub-pixel 49B reproduce a black display color. When all of the white sub-pixel 49W, the yellow-green sub-pixel 49Yg, the blue-green sub-pixel 49Bg, and the blue sub-pixel 49B reproduce the black display color, the pixel 48 reproduces the black display color. In contrast, when the sub-pixel 61 included in at least one of the white sub-pixel 49W, the yellow-green sub-pixel 49Yg, the blue-green sub-pixel 49Bg, and the blue sub-pixel 49B is not in the black reflection state PB, the pixel 48 reproduces a display color other than black. The color reproduced by the pixel 48 corresponds to the states of the respective sub-pixels 61 included in the white sub-pixel 49W, the yellow-green sub-pixel 49Yg, the blue-green sub-pixel 49Bg, and the blue sub-pixel 49B.

FIG. 8 is a tabular diagram illustrating an example of a relation of the display colors reproduced by the pixel 48 with combinations of colors of the color filters CF provided on the display surface side of the sub-pixels 61 and a state of the sub-pixels 61. In the table, W, Yg, Bg, and B indicate the colors of the color filters CF (CF COLORS); and RED, YELLOW, GREEN, CYAN, BLUE, PURPLE, and WHITE indicate display colors (DISPLAY COLOR), which also apply to the table illustrated in FIG. 10. A column in which "CF COLOR" is "W" indicates the white sub-pixel 49W. A column in which "CF COLOR" is "Yg" indicates the yellow-green sub-pixel 49Yg. A column in which "CF COLOR" is "Bg" indicates the blue-green sub-pixel 49Bg. A column in which "CF COLOR" is "B" indicates the blue sub-pixel 49B.

In the embodiment, the signal processor 10 controls the sub-pixels 61 corresponding to the display color. The signal processor 10 determines the display color of each of the pixels 48 based on the gradation values of R, G, and B indicated by the input signal IP. The signal processor 10 outputs the output image signal OP including instructions to control the sub-pixels 61 of the white sub-pixel 49W, the yellow-green sub-pixel 49Yg, the blue-green sub-pixel 49Bg, and the blue sub-pixel 49B included in each of the pixels 48 so as to emit the color corresponding to the determined display color toward the display surface.

In FIG. 8 and in FIG. 10 to be described later, the state of the sub-pixel 61 is indicated as "Black", "White", or "Red". "Black" indicates that the sub-pixel 61 is in the black reflection state PB. "White" indicates that the sub-pixel 61 is in the white reflection state PW. "Red" indicates that the sub-pixel 61 is in the red reflection state PR.

The sub-pixel 61 included in the yellow-green sub-pixel 49Yg corresponds to a first sub-pixel. The sub-pixel 61 included in the blue-green sub-pixel 49Bg corresponds to a second sub-pixel. The sub-pixel 61 included in the blue sub-pixel 49B corresponds to a third sub-pixel. The sub-pixel 61 included in the white sub-pixel 49W corresponds to a fourth sub-pixel.

To cause the pixel 48 to reproduce a red display color, the signal processor 10 places the sub-pixels 61 included in the yellow-green sub-pixel 49Yg and the white sub-pixel 49W in the red reflection state PR, places the sub-pixel 61 included in the blue-green sub-pixel 49Bg in the black reflection state PB, and places the sub-pixel 61 included in the blue sub-pixel 49B in a state other than the white reflection state PW. To cause the sub-pixels 61 included in the pixel 48 to reproduce a yellow display color, the signal processor 10 places the sub-pixels 61 included in the yellow-green sub-pixel 49Yg and the blue-green sub-pixel 49Bg in the white reflection state PW, places the sub-pixel 61 included in the blue sub-pixel 49B in the state other than the white reflection state PW, and places the sub-pixel 61 included in the white sub-pixel 49W in the red reflection state PR. Here, the state other than the white reflection state PW refers to the black reflection state PB.

To cause the pixel 48 to reproduce a green display color, the signal processor 10 places the sub-pixels 61 included in the yellow-green sub-pixel 49Yg and the blue-green sub-pixel 49Bg in the white reflection state PW, and places the sub-pixels 61 included in the blue sub-pixel 49B and the white sub-pixel 49W in the black reflection state PB.

To cause the pixel 48 to reproduce a cyan display color, the signal processor 10 places the sub-pixels 61 included in the yellow-green sub-pixel 49Yg, the blue-green sub-pixel 49Bg, and the blue sub-pixel 49B in the white reflection state PW, and places the sub-pixel 61 included in the white sub-pixel 49W in the black reflection state PB.

To cause the pixel 48 to reproduce a blue display color, the signal processor 10 places the sub-pixels 61 included in the yellow-green sub-pixel 49Yg, the blue-green sub-pixel 49Bg, and the white sub-pixel 49W in the black reflection state PB, and places the sub-pixel 61 included in the blue sub-pixel 49B in the white reflection state PW.

To cause the pixel 48 to reproduce a purple display color, the signal processor 10 places the sub-pixels 61 included in the yellow-green sub-pixel 49Yg and the blue-green sub-pixel 49Bg in the black reflection state PB, places the blue sub-pixel 49B in the white reflection state PW, and places the sub-pixel 61 included in the white sub-pixel 49W in the red reflection state PR.

To cause a white display color to be reproduced, the signal processor 10 places the sub-pixels 61 included in the yellow-green sub-pixel 49Yg, the blue-green sub-pixel 49Bg, the blue sub-pixel 49B, and the white sub-pixel 49W in the white reflection state PW.

Figure 9:
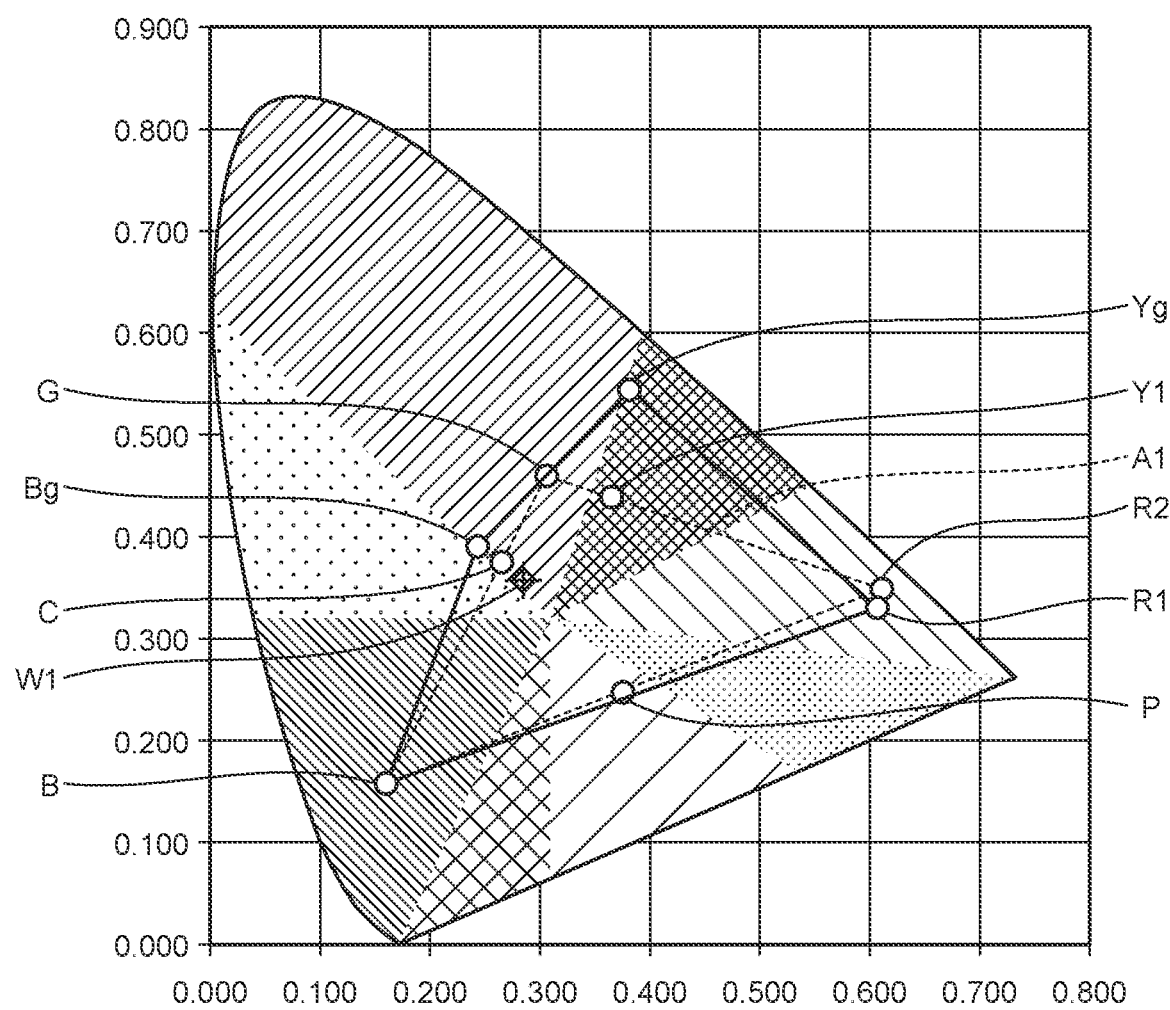
FIG. 9 is a diagram illustrating a color space in an XYZ color system, the color space being obtained by reproducing the display colors in accordance with the colors of the color filters and the tabular diagram of FIG. 8.

FIG. 9 is a diagram illustrating a color space A1 in an XYZ color system, the color space A1 being obtained by reproducing the display colors in accordance with the colors of the color filters CF and the tabular diagram of FIG. 8. In FIG. 9 and in FIG. 11 to be described later, a blue color B indicates a color reproduced by the light emitted toward the display surface by the blue sub-pixel 49B when the sub-pixel 61 is in the white reflection state PW. A yellow-green color Yg indicates a color reproduced by the light emitted toward the display surface by the blue-green sub-pixel 49Bg when the sub-pixel 61 is in the white reflection state PW. A blue-green color Bg indicates a color reproduced by the light emitted toward the display surface by the yellow-green sub-pixel 49Yg when the sub-pixel 61 is in the white reflection state PW. A first red color R1 indicates a color reproduced by the light transmitted by the white sub-pixel 49W when the sub-pixel 61 is in the red reflection state PR.

The red display color in FIG. 8 corresponds to a second red color R2 in FIG. 9. This is because the first red color R1 reproduced by the reflected light caused by the red reflection state PR of the white sub-pixel 49W is deviated toward the yellow-green color Yg since the sub-pixel 61 of the yellow-green sub-pixel 49Yg is in the red reflection state PR. The other display colors correspond to colors in a quadrilateral having the first red color R1, the yellow-green color Yg, the blue-green color Bg, and the blue color B as apexes in the XYZ color system. The yellow display color in FIG. 8 corresponds to a first yellow color Y1 in FIG. 9. The yellow display can also be obtained by, besides the above approach, placing the sub-pixel 61 included in the yellow-green sub-pixel 49Yg in the white reflection state PW, placing the sub-pixels 61 included in the blue-green sub-pixel 49Bg and the blue sub-pixel 49B in the black reflection state PB, and placing the sub-pixel 61 included in the white sub-pixel 49W in the red reflection state PR. This yellow color is, however, darkened by being deviated from the first yellow color Y1 in FIG. 9 toward the first red color R1. The green display color in FIG. 8 corresponds to a green color G in FIG. 9. The cyan display color in FIG. 8 corresponds to a cyan color C in FIG. 9. The cyan display can also be obtained by, besides the above approach, placing the sub-pixels 61 included in the blue-green sub-pixel 49Bg and the blue sub-pixel 49B in the white reflection state PW, and placing the sub-pixels 61 included in the yellow-green sub-pixel 49Yg and the white sub-pixel 49W in the black reflection state PB. This cyan is, however, darkened by being deviated from the cyan color C in FIG. 9 toward the blue color B. The blue display color in FIG. 8 corresponds to the blue color B in FIG. 9. The purple display color in FIG. 8 corresponds to a purple color P in FIG. 9. The purple color display can also be obtained by, besides the above approach, placing the sub-pixels 61 included in the yellow-green sub-pixel 49Yg and the white sub-pixel 49W in the red reflection state PR, placing the sub-pixel 61 included in the blue sub-pixel 49B in the white reflection state PW, and placing the sub-pixel 61 included in the blue-green sub-pixel 49Bg in the black reflection state PB. This purple color is brighter than the purple color P in FIG. 9, but is deviated toward the first red color R1. The white display color corresponds to a first white color W1 in FIG. 9.

Figure 11:
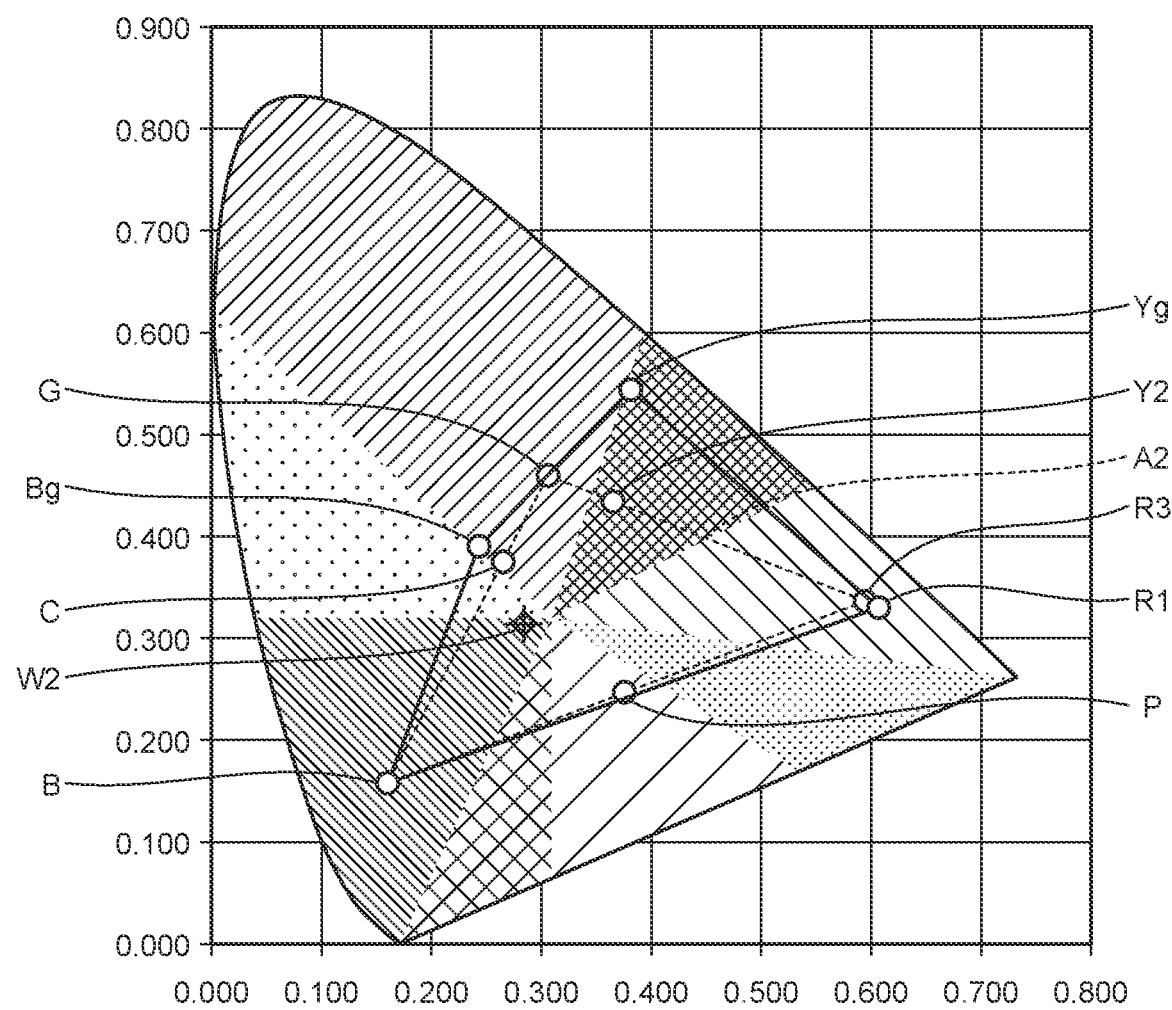
FIG. 11 is a diagram illustrating another color space in the XYZ color system, the other color space being obtained by reproducing the display colors in accordance with the colors of the color filters and the tabular diagram of FIG. 10.

A hatched area including the green color G in FIGS. 9 and 11 is a green-based color area in the XYZ color system. A hatched area including the blue color B is a blue-based color area in the XYZ color system. A hatched area including the first red color R1 is a red-based color area in the XYZ color system. A hatched area including the purple color P is a purple-based color area in the XYZ color system. A cross-hatched area located between the purple-based color area and the blue-based color area is an indigo-based color area in the XYZ color system. A cross-hatched area located between the red-based color area and the green-based color area is a yellow-based color area in the XYZ color system. An area located between the green-based color area and the blue-based color area is a cyan-based color area in the XYZ color system. A dotted area located between the red-based color area and the purple-based color area is a magenta-based color area in the XYZ color system.

As described above, according to the embodiment, the display device 1 includes the display substrate 60 and the filter 50 provided on the display surface side of the display substrate 60. The filter 50 includes the first color filter CFYg, the second color filter CFBg, the third color filter CFB, and the fourth filter CFW. The spectrum of the light transmitted by the first color filter CFYg has a peak in green closer to red. The spectrum of the light transmitted by the second color filter CFBg has a peak in green closer to blue. The spectrum of the light transmitted by the third color filter CFB has a peak in blue. The display substrate 60 includes the sub-pixels 61 provided so as to be individually switchable between the white reflection state PW, the black reflection state PB, and the red reflection state PR. The pixel 48 includes the yellow-green sub-pixel 49Yg overlapping the first color filter CFYg, the blue-green sub-pixel 49Bg overlapping the second color filter CFBg, the blue sub-pixel 49B overlapping the third color filter CFB, and the white sub-pixel 49W overlapping the fourth filter CFW.

Thus, a wide variety of display colors can be reproduced by the combination of the sub-pixels 61 switchable between the white reflection state PW, the black reflection state PB, and the red reflection state PR, and the spectra of the light transmitted by the color filters CF.

The display substrate 60 also includes the pixel electrodes 64 provided on the pixel substrate 62, the counter electrode 67 provided on the counter substrate 65, and the electro-phoretic layer 70 enclosed between the pixel substrate 62 and the counter substrate 65. The electrophoretic layer 70 includes the white particles 72W serving as white pigment particles, the black particles 72B serving as black pigment particles, and the red particles 72R serving as red pigment particles. In the display substrate 60, the pigment particles to be located closest to the display surface are switched depending on an electrical charge that is applied to the electrophoretic layer 70 by the pixel electrodes 64 and the counter electrode 67. As a result, the color of the sub-pixels 61 is switched between white, black, and red with lower power consumption than in a case of using a self-luminous display panel or a display panel requiring a light source.

Modification

The relation between the display colors and the control of the sub-pixels 61 are not limited to that in the example of FIG. 8. The following describes a modification of the relation between the display colors and the control of the sub-pixels 61 with reference to FIGS. 10 and 11.

FIG. 10 is a tabular diagram illustrating the modification of the relation of the display colors reproduced by the pixel 48 with the combinations of colors of the color filters CF included in the sub-pixels and the state of the sub-pixels 61.

To cause the pixel 48 to reproduce the red display color, the signal processor 10 of the modification places the sub-pixels 61 included in the yellow-green sub-pixel 49Yg and the white sub-pixel 49W in the red reflection state PR, places the sub-pixel 61 included in the blue-green sub-pixel 49Bg in the black reflection state PB, and places the sub-pixel 61 included in the blue sub-pixel 49B in a state other than the white reflection state PW. To cause the pixel 48 to reproduce the yellow display color, the signal processor 10 of the modification places the sub-pixels 61 included in the yellow-green sub-pixel 49Yg and the blue-green sub-pixel 49Bg in the white reflection state PW, places the sub-pixel 61 included in the blue sub-pixel 49B in the state other than the white reflection state PW, and places the sub-pixel 61 included in the white sub-pixel 49W in the red reflection state PR. Here, the state other than the white reflection state PW refers to the red reflection state PR.

As illustrated by the line L1 in FIG. 7, the third color filter CFB transmits the light at the first wavelength P1 to a certain extent. Therefore, light in the area of the pixel 48 can increased by placing not only the sub-pixel 61 of the white sub-pixel 49W but also the sub-pixel 61 of the blue sub-pixel 49B in the red reflection state PR. However, as illustrated by the long dashed double-short dashed line L4 in FIG. 7, the light reflected when the sub-pixel 61 is in the red reflection state PR includes almost no light with the second wavelength P2. Therefore, an influence of a blue component on the red display color and the yellow display color is virtually ignorable even when the sub-pixel 61 of the blue sub-pixel 49B is placed in the red reflection state PR. Consequently, the red display color and the yellow display color can be brighter colors.

To cause the pixel 48 to reproduce the white display color, the signal processor 10 of the modification places the sub-pixel 61 included in the yellow-green sub-pixel 49Yg in the red reflection state PR, and places the sub-pixels 61 included in the blue-green sub-pixel 49Bg, the blue sub-pixel 49B, and the white sub-pixel 49W in the white reflection state PW. In this way, a white point can be adjusted by placing the sub-pixels 61 included in the sub-pixels other than the white sub-pixel 49W in the red reflection state PR. Other colors (green, cyan, blue, and purple) are reproduced as illustrated in FIG. 10.

As described above, the control of the sub-pixels 61 by the signal processor 10 of the modification is the same as the control of the sub-pixels 61 by the signal processor 10 described with reference to FIG. 8, except in the points described otherwise.

FIG. 11 is a diagram illustrating a color space A2 in the XYZ color system, the color space A2 being obtained by reproducing the display colors in accordance with the colors of the color filters CF and the tabular diagram of FIG. 10. The red display color in FIG. 10 corresponds to a third red color R3 in FIG. 11. The yellow display color in FIG. 10 corresponds to a second yellow color Y2 in FIG. 11. The white display color in FIG. 10 corresponds to a second white color W2 in FIG. 11.

As described above, according to the modification the red display color and the yellow display color can be brighter colors. In addition, the white point can be adjusted to be different from that of the embodiment.

The filter 50 in the embodiment and the modification (the embodiment and the like) described above is what is called an electronic paper panel that uses an electrophoretic fluid containing a plurality of pigment particles. However, this is merely an example of a specific embodiment of the filter 50. The present disclosure is not limited thereto. The filter 50 may be a transmissive, transflective, or reflective liquid crystal display device provided so as to be capable of switching each sub-pixel between white, black, and red, or may be a self-luminous display panel, such as an organic light emitting diode (OLED) panel, that uses organic electroluminescence, or a display panel provided so as to be capable of switching each sub-pixel between white, black, and red using another method.

Other operational advantages accruing from the aspects described in the embodiment and the like that are obvious or appropriately conceivable by those skilled in the art from the description herein will naturally be understood as accruing from the present disclosure.

What is claimed is:

1. A display device comprising:
a display substrate; and
a filter provided on a display surface side of the display substrate, wherein
the filter comprises a first sub-pixel area provided with a first color filter, a second sub-pixel area provided with a second color filter, a third sub-pixel area provided with a third color filter, and a colorless fourth sub-pixel area,
the display substrate comprises a plurality of pixels provided so as to be capable of individually switching each sub-pixel between white, black, and red,
each of the pixels comprises a first sub-pixel overlapping the first sub-pixel area, a second sub-pixel overlapping the second sub-pixel area, a third sub-pixel overlapping the third sub-pixel area, and a fourth sub-pixel overlapping the fourth sub-pixel area,
the first color filter transmits light having a spectrum with a peak in green closer to red,
the second color filter transmits light having a spectrum with a peak in green closer to blue,
the third color filter transmits light having a spectrum with a peak in blue, and
a green display color is reproduced by switching the first sub-pixel and the second sub-pixel to white, and switching the third sub-pixel and the fourth sub-pixel to black.

2. The display device according to claim 1, wherein a cyan display color is reproduced by switching the first sub-pixel, the second sub-pixel, and the third sub-pixel to white, and switching the fourth sub-pixel to black.

3. The display device according to claim 1, wherein a red display color is reproduced by switching the first sub-pixel and the fourth sub-pixel to red, switching the second sub-pixel to white, and switching the third sub-pixel to a color other than white.

4. The display device according to claim 3, wherein the color other than white is black.

5. The display device according to claim 3, wherein the color other than white is red.

6. The display device according to claim 1, wherein a yellow display color is reproduced by switching the first sub-pixel and the second sub-pixel to white, switching the third sub-pixel to a color other than white, and switching the fourth sub-pixel to red.

7. The display device according to claim 6, wherein the color other than white is black.

8. The display device according to claim 6, wherein the color other than white is red.

9. The display device according to claim 1, wherein a white display color is reproduced by switching the first sub-pixel, the second sub-pixel, the third sub-pixel, and the fourth sub-pixel to white.

10. The display device according to claim 1, wherein a white display color is reproduced by switching the first sub-pixel to red, and switching the second sub-pixel, the third sub-pixel, and the fourth sub-pixel to white.

11. The display device according to claim 1, wherein the fourth sub-pixel area comprises no color filter.

12. The display device according to claim 1, wherein the fourth sub-pixel area comprises a colorless light-transmitting member.

13. The display device according to claim 1, wherein a blue display color is reproduced by switching the first sub-pixel, the second sub-pixel, and the fourth sub-pixel to black, and switching the third sub-pixel to white.

14. The display device according to claim 1, wherein a purple display color is reproduced by switching the first sub-pixel and the second sub-pixel to black, switching the third sub-pixel to white, and switching the fourth sub-pixel to red.

15. A display device comprising:
a display substrate; and
a filter provided on a display surface side of the display substrate,
wherein
the filter comprises a first sub-pixel area provided with a first color filter, a second sub-pixel area provided with a second color filter, a third sub-pixel area provided with a third color filter, and a colorless fourth sub-pixel area,
the display substrate comprises a plurality of pixels provided so as to be capable of individually switching each sub-pixel between white, black, and red,
each of the pixels comprises a first sub-pixel overlapping the first sub-pixel area, a second sub-pixel overlapping the second sub-pixel area, a third sub-pixel overlapping the third sub-pixel area, and a fourth sub-pixel overlapping the fourth sub-pixel area,
the first color filter transmits light having a spectrum with a peak in green closer to red,
the second color filter transmits light having a spectrum with a peak in green closer to blue,
the third color filter transmits light having a spectrum with a peak in blue, and a blue display color is reproduced by switching the first sub-pixel, the second sub-pixel, and the fourth sub-pixel to black, and switching the third sub-pixel to white.

16. A display device comprising:

a display substrate; and a filter provided on a display surface side of the display substrate, wherein the filter comprises a first sub-pixel area provided with a first color filter, a second sub-pixel area provided with a second color filter, a third sub-pixel area provided with a third color filter, and a colorless fourth sub-pixel area, the display substrate comprises a plurality of pixels provided so as to be capable of individually switching each sub-pixel between white, black, and red, each of the pixels comprises a first sub-pixel overlapping the first sub-pixel area, a second sub-pixel overlapping the second sub-pixel area, a third sub-pixel overlapping the third sub-pixel area, and a fourth sub-pixel overlapping the fourth sub-pixel area, the first color filter transmits light having a spectrum with a peak in green closer to red, the second color filter transmits light having a spectrum with a peak in green closer to blue, the third color filter transmits light having a spectrum with a peak in blue, and a purple display color is reproduced by switching the first sub-pixel and the second sub-pixel to black, switching the third sub-pixel to white, and switching the fourth sub-pixel to red.

* * * * *